P. VAN S. KOLFF & J. E. HOLLYDAY.
TACHOMETER.
APPLICATION FILED SEPT. 14, 1914.

1,148,692.

Patented Aug. 3, 1915.

Witnesses:
E. Daniels.
C. H. Potter.

Inventors
Petrus van Santen Kolff &
James E. Hollyday
Byrnes Townsend Buckenstein Attys.

UNITED STATES PATENT OFFICE.

PETRUS VAN SANTEN KOLFF, OF MOYLAN, AND JAMES E. HOLLYDAY, OF PHILADELPHIA, PENNSYLVANIA, ASSIGNORS TO THE ELECTRIC TACHOMETER COMPANY, OF PHILADELPHIA, PENNSYLVANIA, A CORPORATION OF NEW JERSEY.

TACHOMETER.

1,148,692.  Specification of Letters Patent. Patented Aug. 3, 1915.

Application filed September 14, 1914. Serial No. 861,565.

*To all whom it may concern:*

Be it known that we, (1) PETRUS VAN SANTEN KOLFF and (2) JAMES E. HOLLYDAY, citizens of the United States, residing at (1) Moylan and (2) Philadelphia, in the counties of (1) Delaware and (2) Philadelphia, and State of (1 and 2) Pennsylvania, have invented certain new and useful Improvements in Tachometers, of which the following is a specification.

This invention relates to tachometers particularly intended for use on ships and is designed to enable a number of indicating instruments to be connected to the same electric generator.

On ship-board it is desirable to locate the indicators in various parts of the vessel, such as the bridge, chart-house, and engine-room, and it is the object of this invention to make possible the use of two or more indicators in circuit with the same generator and at the same time to provide means whereby, should one or more indicators be out of commission, the remaining indicators will still be kept in service without affecting the accuracy of their indications.

Figure 1:
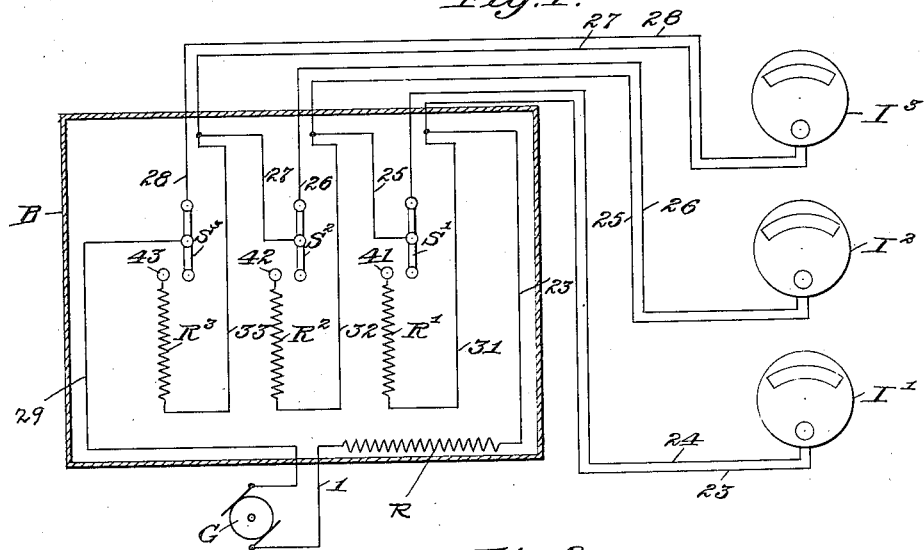
Figure 2:
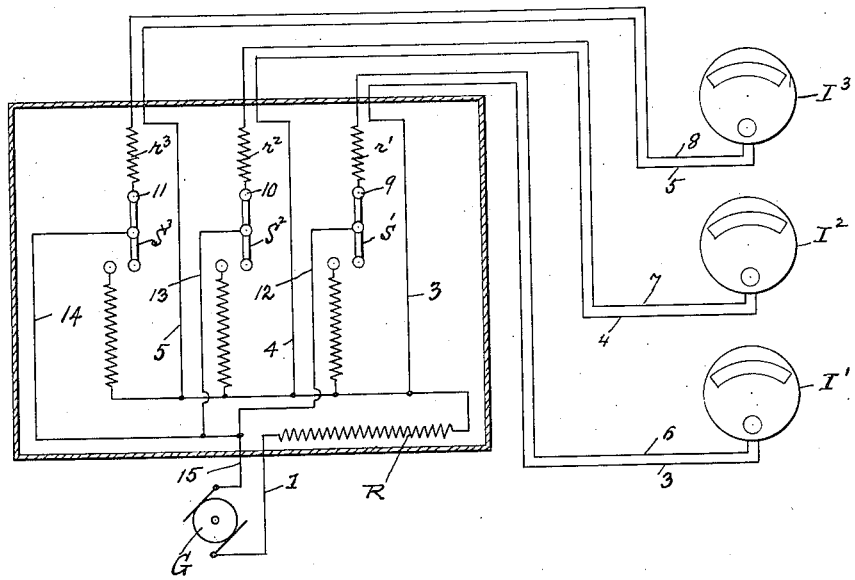

Referring to the drawings—Figure 1 is a diagram showing the connections when the indicators are connected in series with the generator; and Fig. 2 is a diagram showing the connections when the indicators are connected in parallel to the generator.

The system heretofore in use comprises an electric generator preferably of the direct-current type driven from the shaft or other rotating object whose speed of motion is to be indicated, the current generated being delivered to an indicating galvanometer. In the present system, a generator G is connected to several indicators by means of a system of switches and calibrating resistances, all of which are located at one place and preferably within a box or chamber B.

Referring to Fig. 1, the diagram shows an arrangement in which the indicators are connected in series with each other and the generator, and this is the preferred system, as the error due to local variations in temperature is distributed over the entire construction, and all the indicators will give like readings under all conditions of temperature variations. In this series system, the connections are from generator G through wire 1, variable calibrating resistance R, wire 23, indicator $I^1$, wire 24, switch $S^1$, wire 25, indicator $I^2$, wire 26, switch $S^2$, wire 27, indicator $I^3$, wire 28, switch $S^3$, wire 29, back to the generator. Separate connecting wires 31, 32, and 33 connect wires 23, 25, and 27, through variable resistances $R^1$, $R^2$, $R^3$, to the terminals 41, 42, 43, of the double-throw switches $S^1$, $S^2$, $S^3$, so that when any one of the switches is turned, the corresponding indicator will be cut out and an equivalent resistance included in the circuit.

Referring to Fig. 2, which illustrates the parallel system of connection, the circuit is from the generator G through wire 1 to the main calibrating variable resistance R, thence to the common wire 2, through wires 3, 4, 5, indicators $I^1$, $I^2$, $I^3$, back through connections 6, 7, 8, to the variable calibrating resistances $r^1$, $r^2$, $r^3$, to the terminals 9, 10, 11 of the double-throw switches $S^1$, $S^2$, $S^3$, thence from the switches through wires 12, 13, 14, common return wire 15, to the generator.

Should any accident happen to one of the indicators, as for example $I^1$, the corresponding switch $S^1$ is shifted to cut out the indicator and to include instead the resistance $R^1$. These resistances $R^1$, $R^2$, $R^3$, in both the systems referred to, are each so adjusted as to exactly correspond to the resistances of the particular indicator circuit to which it is to be connected.

By means of the main calibrating resistance R and the small resistances $r^1$, $r^2$, $r^3$, the system as a whole, and the individual circuits, can be accurately adjusted to produce the requisite current in the indicator to give a full scale deflection of the pointer.

We claim:

1. An electric tachometer system, comprising a generator, a number of indicating instruments in circuit with said generator, a like number of resistances each equivalent to an indicating instrument, and means for cutting out any one of said instruments and for inserting an equivalent resistance, whereby the calibration of the system is maintained.

2. An electric tachometer system, comprising a generator, a number of indicating instruments, in series circuit with said generator, a series of double-throw switches in said circuit, one for each indicator, and separate resistance-including connections, each switch being arranged to cut in one of said connections when the corresponding indicator is cut out.

3. An electric tachometer system, comprising a number of indicators, a calibrating box containing a like number of double-throw switches, a like number of resistances each equivalent to an indicator, out and return wires leading from said box to each of said indicators, one terminal of each switch connected to one of said wires, and the other through a resistance to the other wire, a generator connected in series with said indicators, and a calibrating resistance in the generator circuit.

In testimony whereof, we affix our signatures in presence of two witnesses.

PETRUS van SANTEN KOLFF.
JAMES E. HOLLYDAY.

Witnesses:
HARRY S. PLATOWSKY,
N. J. STORM.